United States Patent
Kurihara

(10) Patent No.: US 7,517,122 B2
(45) Date of Patent: Apr. 14, 2009

(54) HEADLIGHT DEVICE FOR A VEHICLE

(75) Inventor: Kouji Kurihara, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 25 days.

(21) Appl. No.: 11/784,009

(22) Filed: Apr. 5, 2007

(65) Prior Publication Data

US 2007/0236949 A1    Oct. 11, 2007

(30) Foreign Application Priority Data

Apr. 6, 2006    (JP) .............................. 2006-105419

(51) Int. Cl.
  *F21V 7/00*    (2006.01)
(52) U.S. Cl. .................................... 362/514
(58) Field of Classification Search ................ 362/507, 362/509, 514, 516, 473, 475–476
See application file for complete search history.

(56) References Cited

U.S. PATENT DOCUMENTS 4,264,944 A * 4/1981 Deverrewaere .............. 362/544
6,464,379 B1 * 10/2002 McKenna .................... 362/473
2004/0246732 A1 * 12/2004 Lewis ......................... 362/475
2006/0023462 A1 * 2/2006 Uemoto et al. ............... 362/475
2006/0193143 A1 * 8/2006 Ohira ......................... 362/473

FOREIGN PATENT DOCUMENTS

JP    63-118101    7/1988

* cited by examiner

*Primary Examiner*—Anabel M Ton
*Assistant Examiner*—Julie A Shallenberger
(74) *Attorney, Agent, or Firm*—Knobbe, Martens, Olson & Bear, LLP

(57) ABSTRACT

A position guide is disposed adjacent a main reflector (head reflector) and formed such that a position width dimension w1 of the position guide is less than a main width dimension of the main reflector. A position bulb is disposed in the position guide. In another embodiment, the position guide is generally tubular and has a front opening disposed generally forwardly of the main reflector.

19 Claims, 15 Drawing Sheets

[Fig. 1]
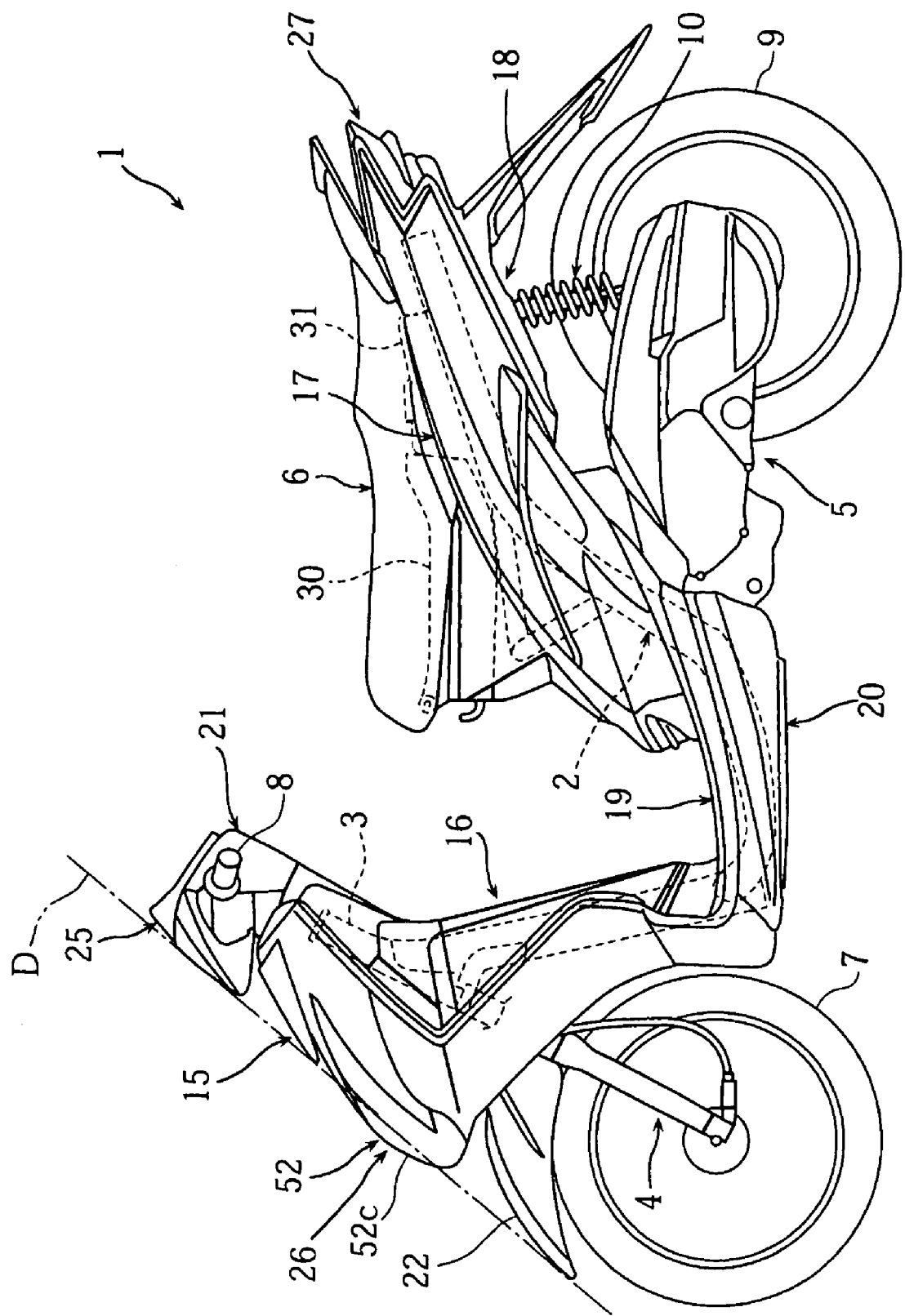

[Fig. 2]
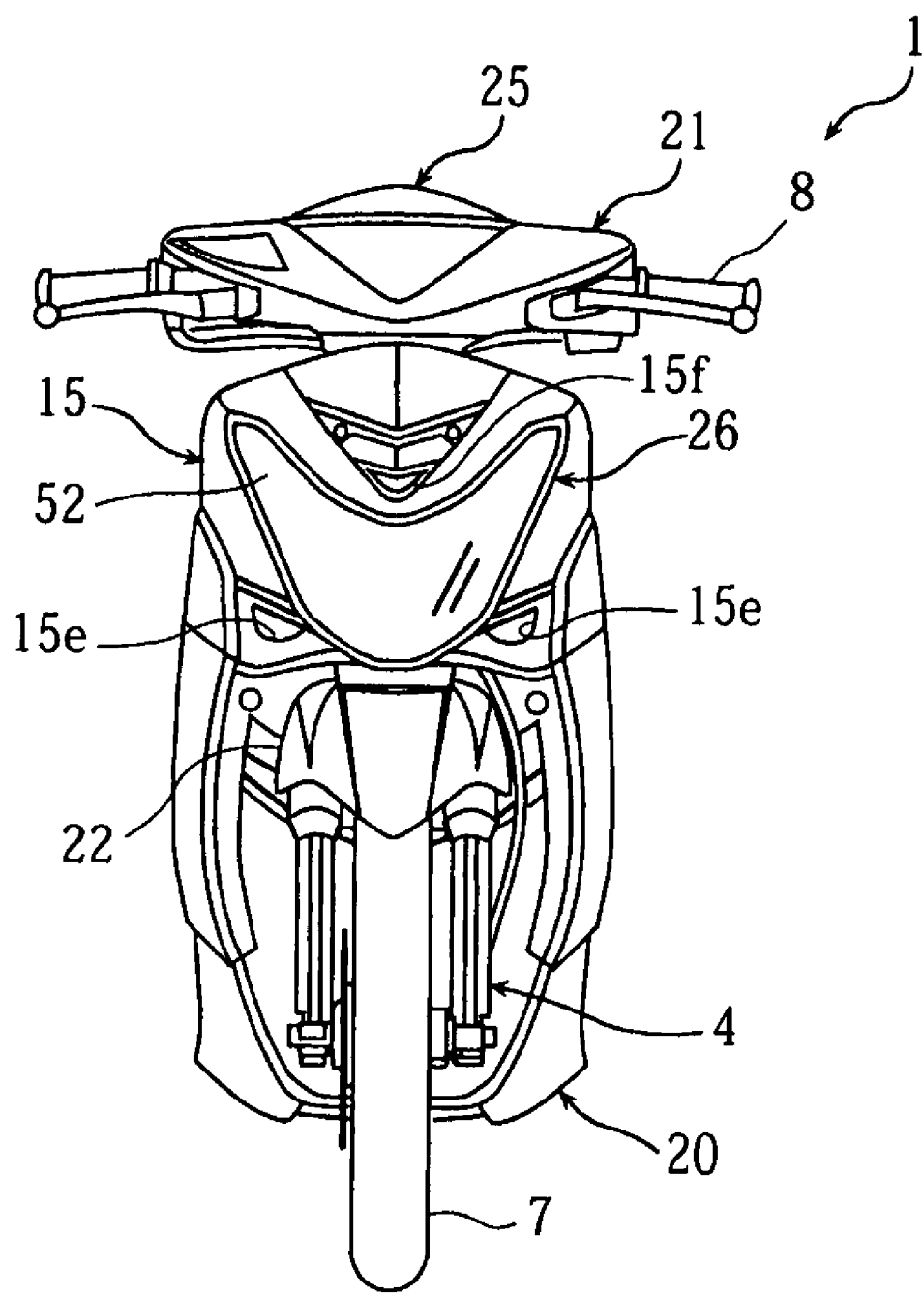

[Fig. 3]
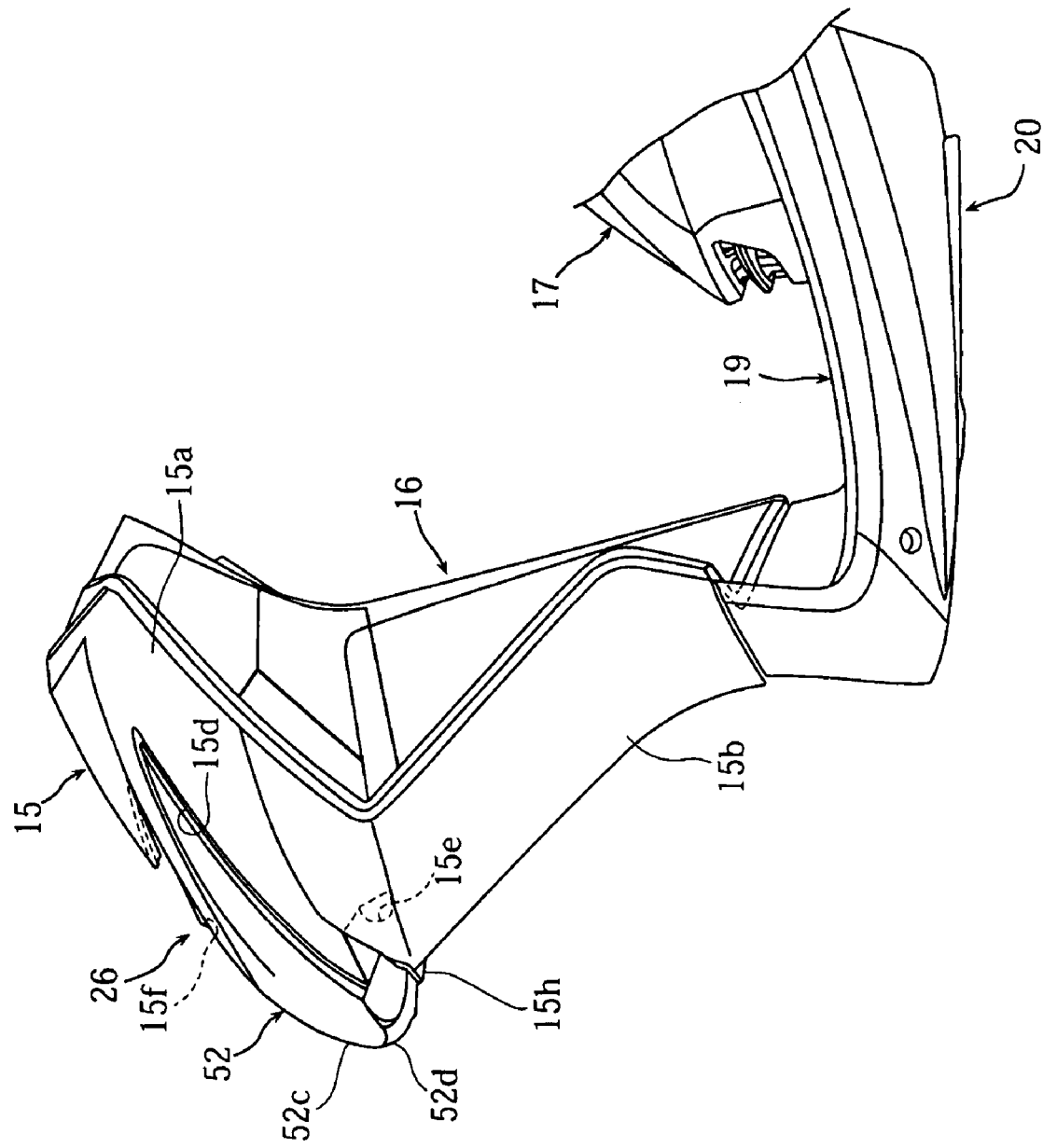

[Fig. 4]
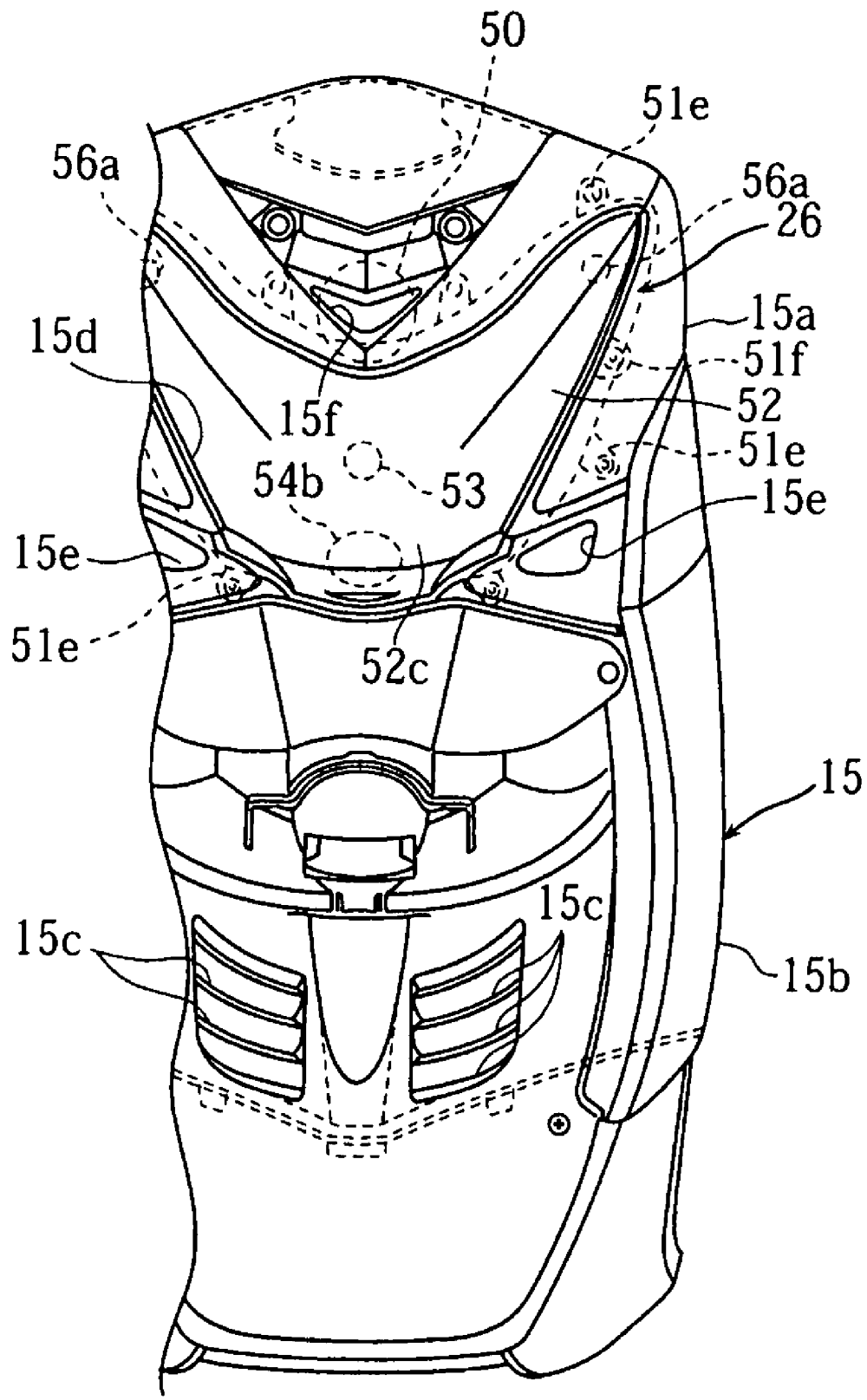

[Fig. 5]
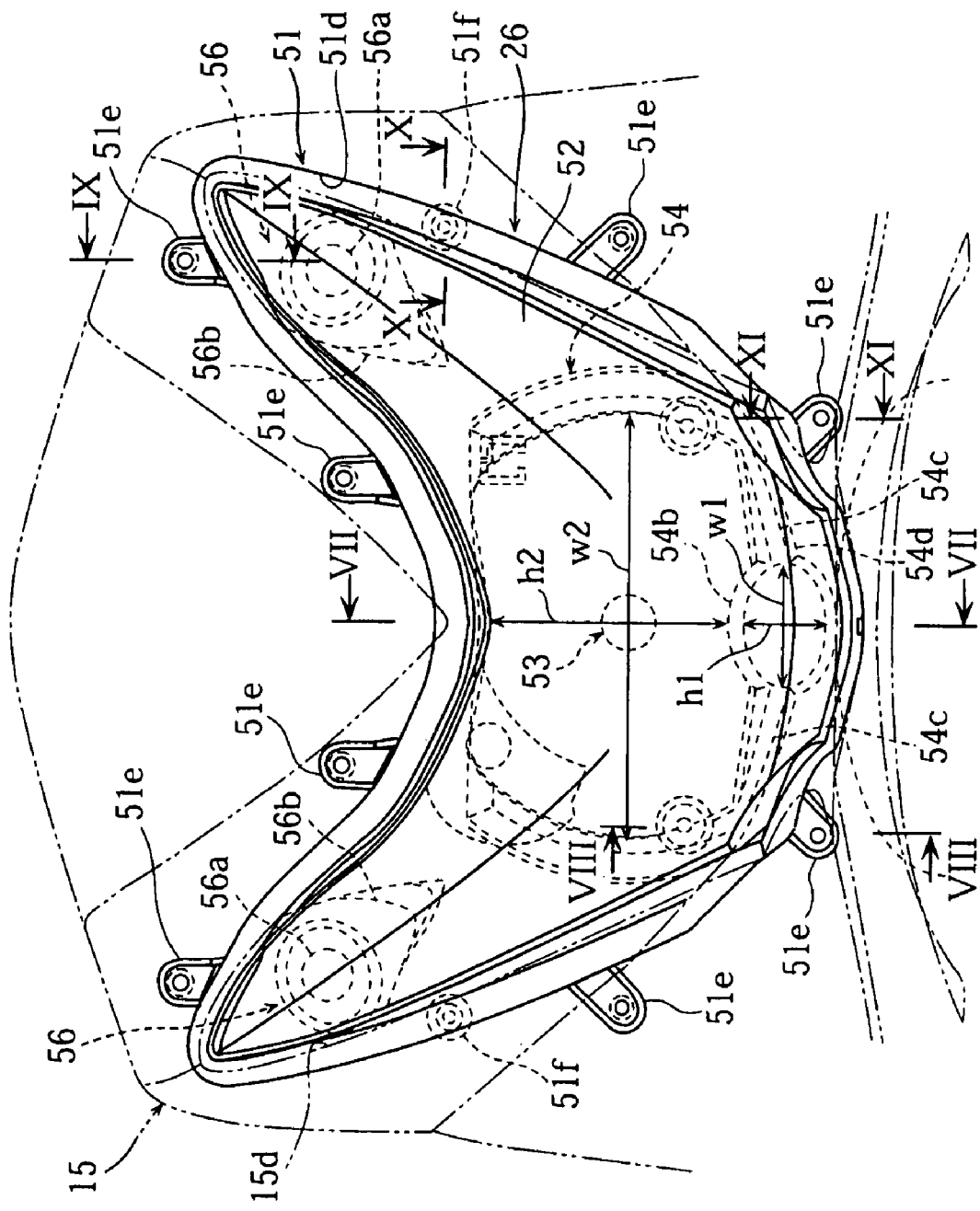

[Fig. 6]
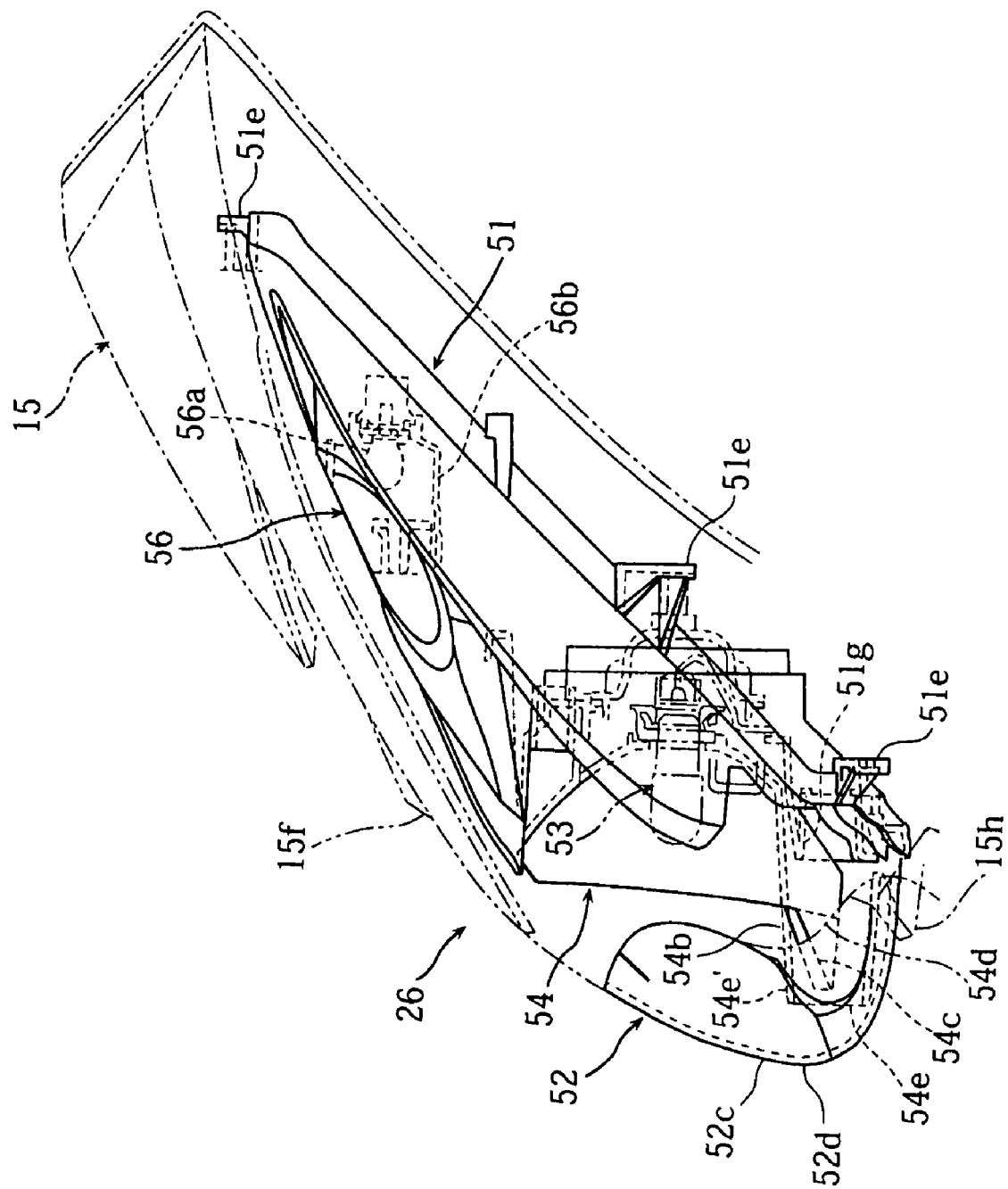

[Fig. 7]
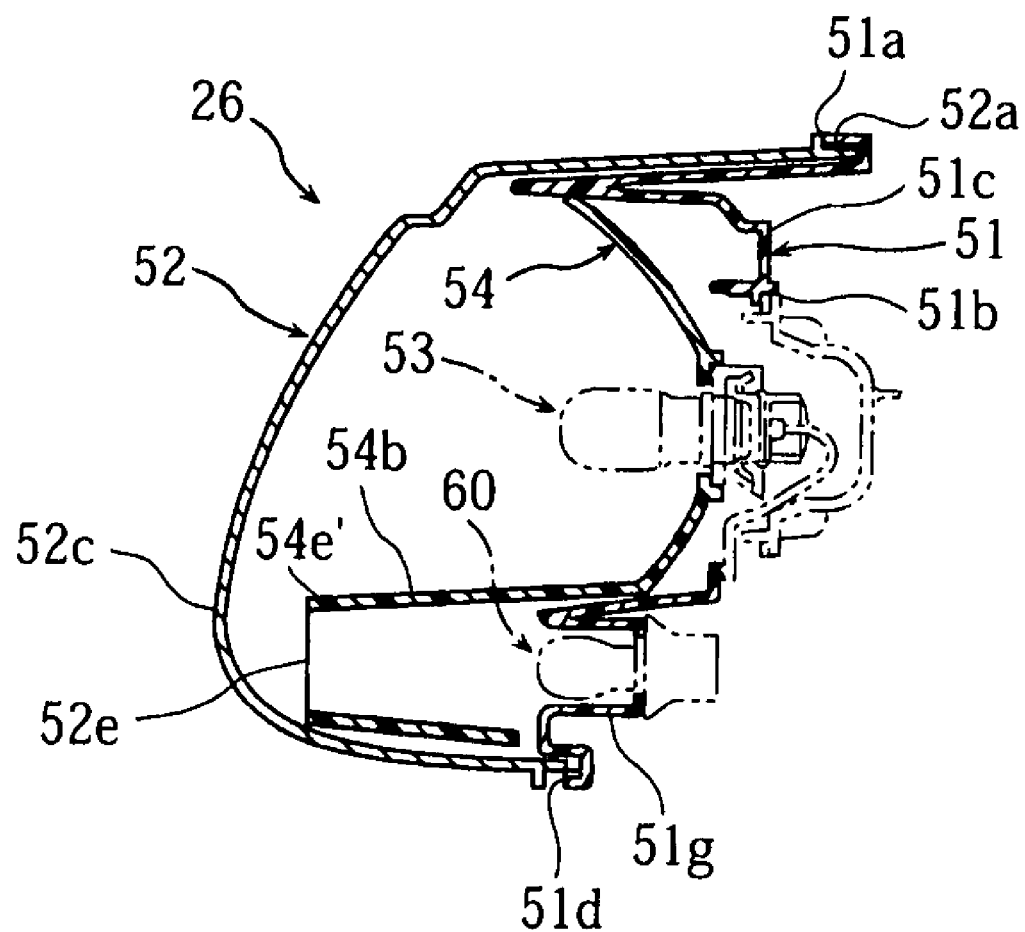

[Fig. 8]
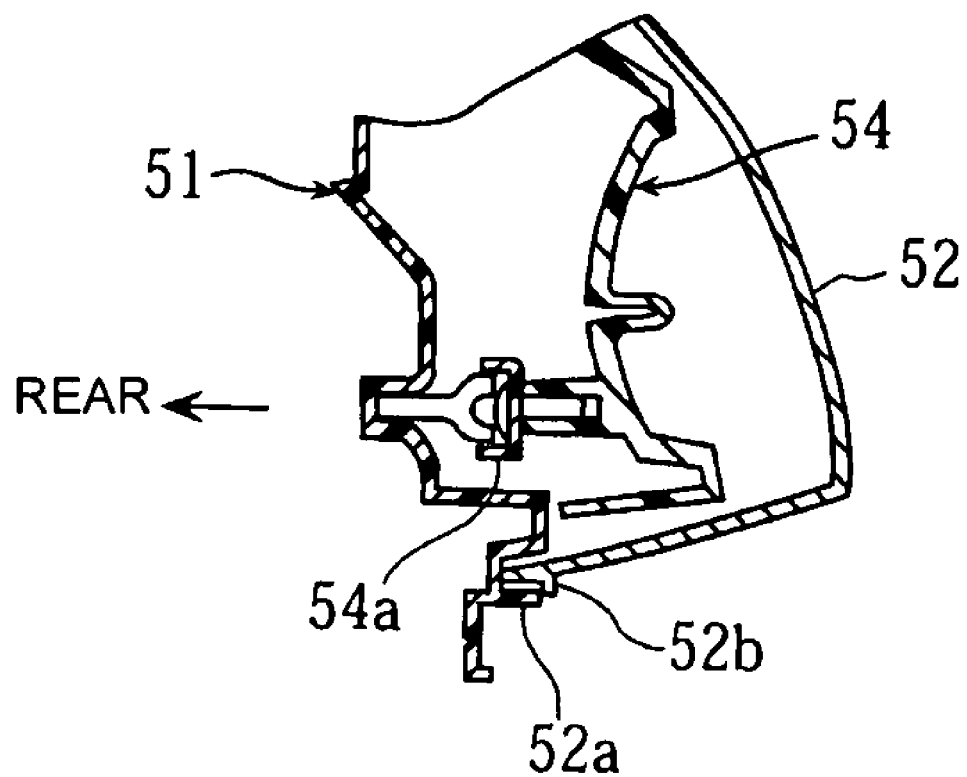

[Fig. 9]
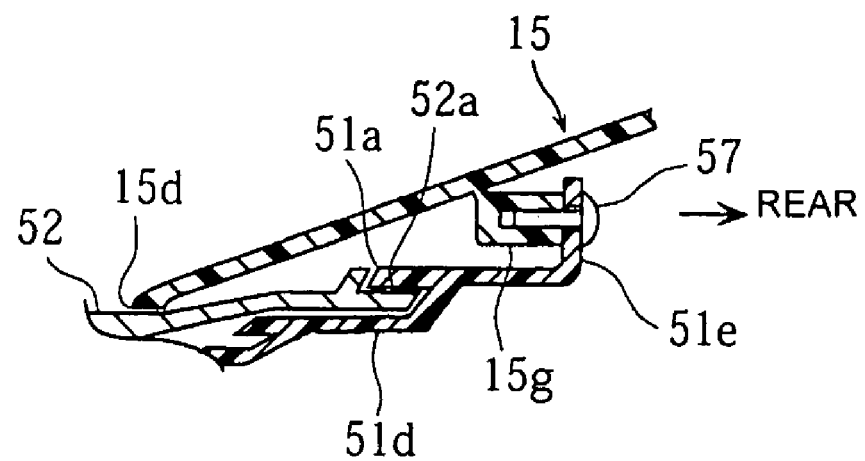

[Fig. 10]
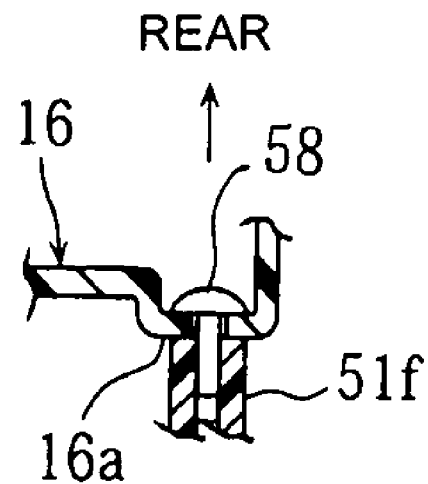

[Fig. 11]
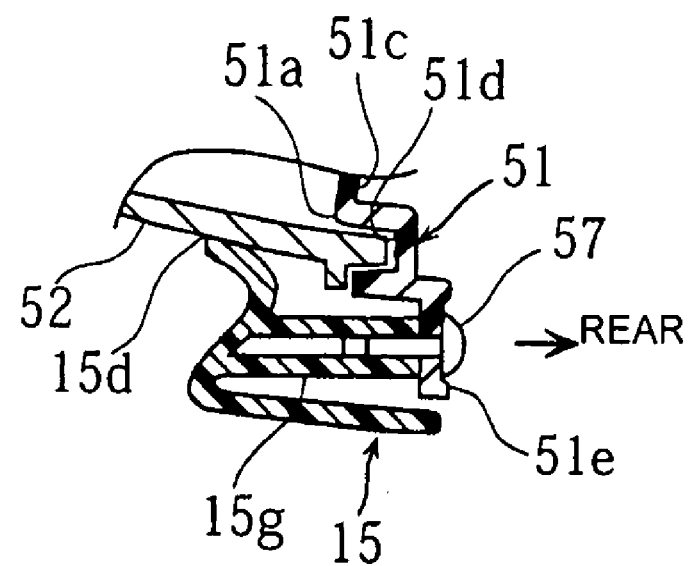

[Fig. 12]
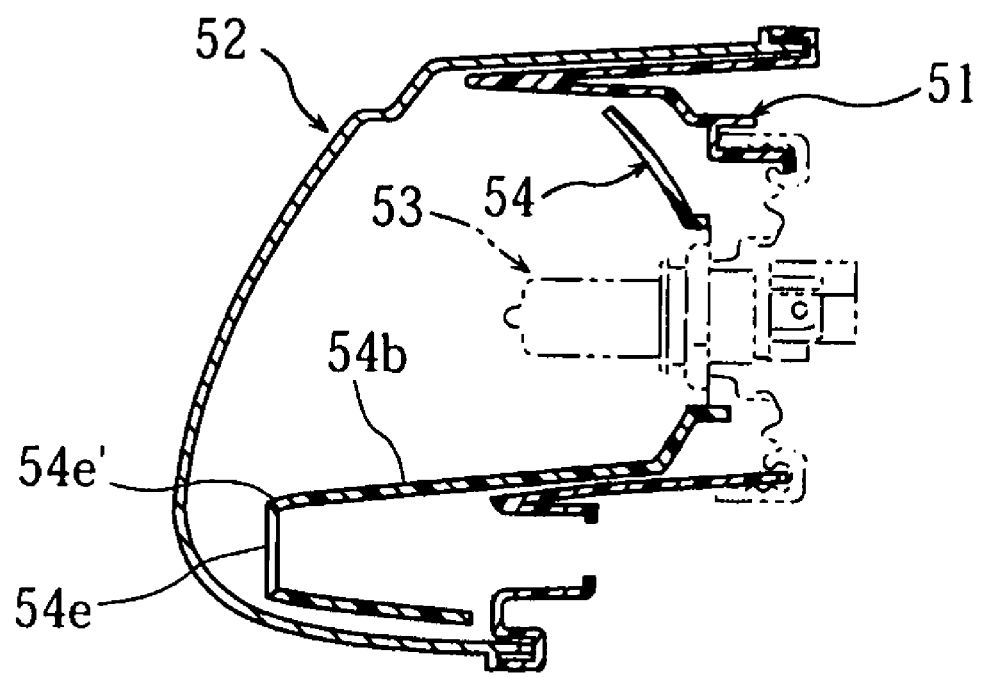

[Fig. 13]
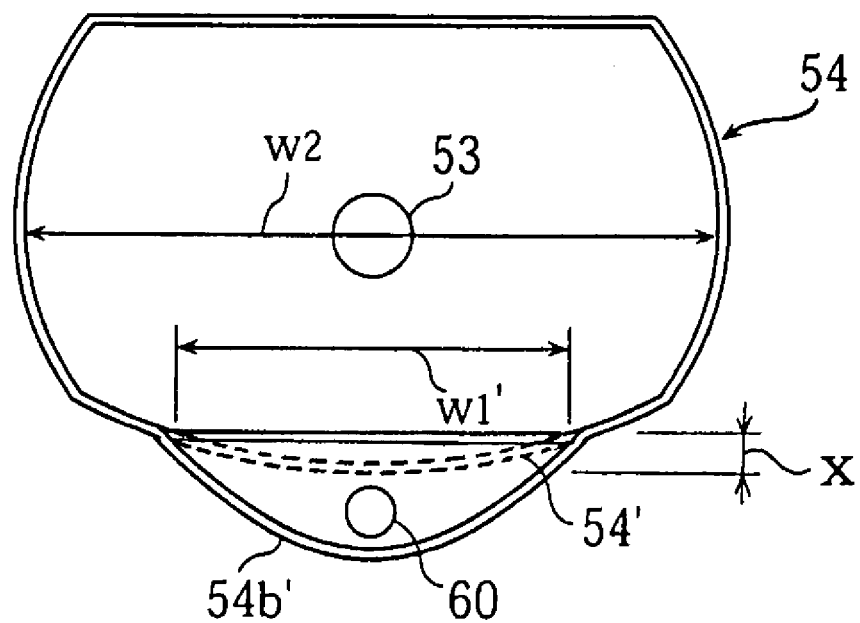

[Fig. 14]
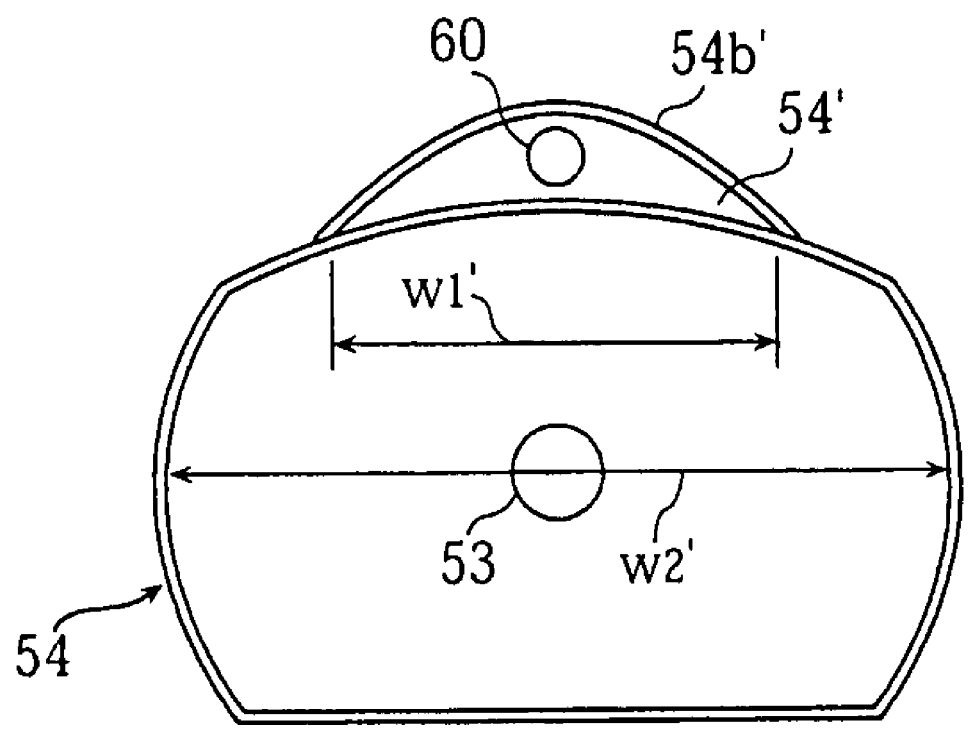

[Fig. 15]
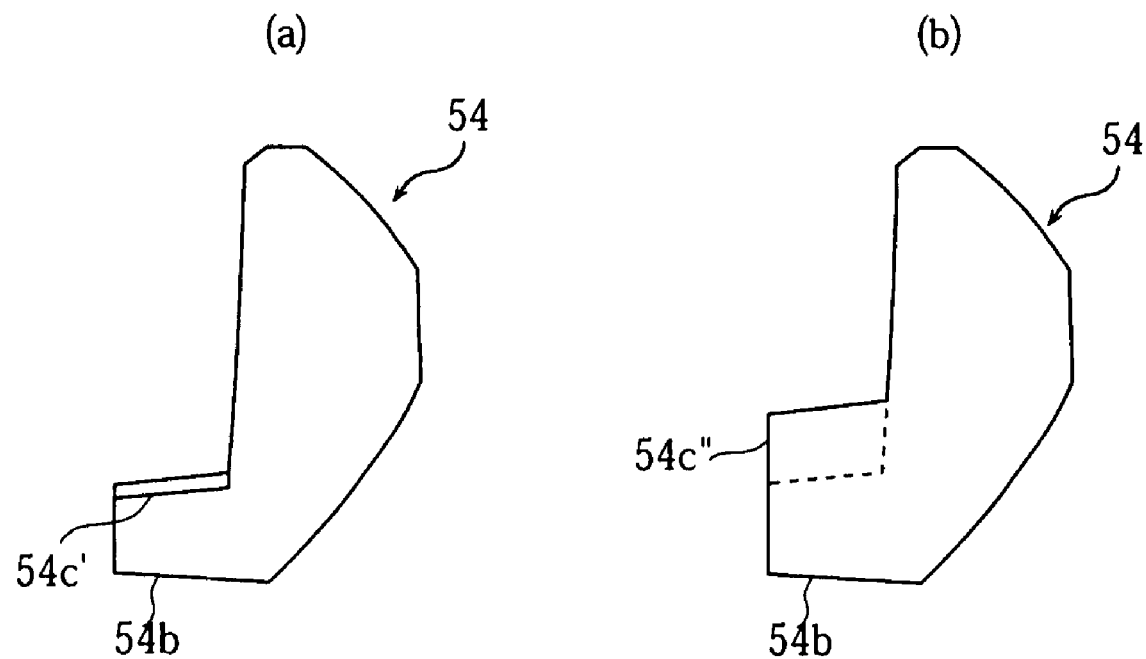

HEADLIGHT DEVICE FOR A VEHICLE

CROSS-REFERENCE TO RELATED APPLICATIONS

The present application is based on and claims priority under 35 U.S.C. § 119 to Japanese Patent Application Serial No. 2006-105419, filed on Apr. 6, 2006, the entire contents of which are expressly incorporated by reference herein.

BACKGROUND OF THE INVENTION

1. Field of the Invention

The present invention relates to a headlight device for vehicle. More particularly, the present invention relates to a headlight having a main bulb and an auxiliary light source.

2. Description of the Related Art

A vehicle headlight device can have a head or main bulb for providing light, but may also have a position bulb, which is an auxiliary light source. Such a position bulb may be desirable for reasons such as increasing passive visibility during daytime running of the vehicle.

Such a headlight device is shown in Japanese document no. JP-UM-A-63-118101, which discloses a main reflector having a main bulb and a sub-reflector having a sub-bulb. The widths of the main reflector and the sub-reflector are approximately the same, and the main reflector and the sub-reflector are accommodated in a common housing. However, this arrangement is somewhat bulky and can be aesthetically unpleasing.

SUMMARY OF THE INVENTION

Accordingly, there is a need in the art for a headlight device having a main bulb and an auxiliary bulb wherein the main and auxiliary bulbs fit within a common housing, but the auxiliary bulb doesn't add excessive bulk to the device and can be inconspicuous, and the headlight device can be aesthetically pleasing. There is also a need in the art for such a headlight device in which the auxiliary bulb is difficult to see.

In accordance with one embodiment, the present invention provides a headlight device for a vehicle. The headlight device comprises a body having an opening, a lens covering the body opening, a main light source supported by the body, a main reflector supported by the body, a generally tubular position guide extending in a front/rear direction and having a front opening, and a position light source arranged at or adjacent the position guide. The main reflector is adapted to reflect light from the main light source in a predetermined direction, and has a maximum width. The position light source is arranged so that light from the position light source is directed out of the position guide front opening. The position guide is arranged adjacent the main reflector and has a maximum width. The position guide maximum width is less than the main reflector maximum width.

In some such embodiments, the position guide light source is arranged at a rear end of the position guide opposite the front opening. In further embodiments, the position guide has a height in a direction generally perpendicular to its width, and the position guide width is greater than the position guide height. In still further embodiments, the main reflector has an outer perimeter shape as seen from the headlight device front, and at least part of the position guide is arranged within the main reflector outer perimeter shape.

In some embodiments, the position guide is disposed below the main bulb. In others, the position guide is disposed above the main bulb. In still further embodiments, the position guide generally tapers from a rear portion toward a front portion.

In yet another embodiment, at least part of the position guide is formed monolithically with the main reflector. In further such embodiments, a front edge of the main reflector and the position guide are monolithically connected by a rib, wherein the rib is configured so that a rib width decreases going forwardly.

In accordance with another embodiment, a headlight device for a vehicle is provided, comprising a body having an opening, a lens covering the body opening, a main light source supported by the body, a main reflector supported by the body, a generally tubular position guide extending in a front/rear direction and having a front opening, and a position light source arranged at or adjacent the position guide and arranged so that light from the position light source is directed out of the position guide front opening. The main reflector is adapted to reflect light from the main light source in a predetermined direction. The position guide front opening is arranged forwardly of the main reflector.

In some such embodiments, the position light source is generally axially aligned with the position guide front opening. In another such embodiment, the position guide light source is arranged at a rear end of the position guide opposite the front opening.

In another embodiment, the lens has a rear edge adapted to engage a front edge of the body, and a front tip of the position guide is disposed forwardly of the rear edge of the lens. In still another embodiment, the lens is curved so as to define a bulging portion, and the front opening of the position guide is generally adjacent the bulging portion of the lens.

In other embodiments, the body has a front edge, and a front tip of the position guide is disposed forwardly of the front edge of the body.

In accordance with yet another embodiment, the present invention provides a vehicle having a headlight device and a front cover surrounding a circumference of the headlight device. The headlight device comprises a body having an opening, a lens covering the body opening, a main reflector disposed in the body opening, a main light source arranged adjacent the main reflector so that the main reflector reflects light from the main light source in a predetermined direction, a generally tubular position guide disposed in the body opening and extending in a front/rear direction of the vehicle, and a position light source. The position guide has a front tip and a front opening. The position light source is arranged so that light from the position light source is directed out of the position guide front opening. The position guide front tip is arranged forwardly of the main reflector, and the position guide front tip is disposed forwardly of a front edge of the front cover.

In one such embodiment, the lens is curved so as to define a bulging portion at a front-most portion of the lens, and the front tip of the position guide is disposed generally within the bulging portion of the lens.

In another embodiment, the position guide has a width and the main reflector has a width, and the position guide width is less than the main reflector width. In still another embodiment, at least part of the position guide is formed monolithically with the main reflector.

BRIEF DESCRIPTION OF THE DRAWINGS

FIG. 1 is a side view of a motorcycle in which there has been disposed a headlight device for vehicle according to one embodiment of the invention.

FIG. 2 is a front view of the motorcycle.

FIG. 3 is a side view of a front cover in which the headlight device has been disposed.

FIG. 4 is a front view of the front cover in which the headlight device has been disposed.

FIG. 5 is a front view of the headlight device.

FIG. 6 is a side view of the headlight device.

FIG. 7 is a sectional view (VII-VII line sectional view of FIG. 5) of the headlight device.

FIG. 8 is a sectional view (VIII-VIII line sectional view of FIG. 5) of the headlight device.

FIG. 9 is a sectional view (IX-IX line sectional view of FIG. 5) of an attaching part of the headlight device.

FIG. 10 is a sectional view (X-X line sectional view of FIG. 5) of the attaching part of the headlight device.

FIG. 11 is a sectional view (XI-XI line sectional view of FIG. 5) of the attaching part of the headlight device.

FIG. 12 is a sectional view showing a modified example of a position guide of the embodiment.

FIG. 13 is a front view showing other modified example of the position guide of the embodiment.

FIG. 14 is a front view showing still other modified example of the position guide of the embodiment.

FIG. 15 is a view showing a modified example of a rib of the position guide of the embodiment.

DETAILED DESCRIPTION OF PREFERRED EMBODIMENTS

FIG. 1 to FIG. 11 are views illustrating a headlight device for a vehicle according to one embodiment of the invention. The present embodiment is discussed in the context of a headlight device of a motorcycle for sake of example. It is to be understood that inventive principles discussed herein can be employed with other types of vehicles, including automobiles, ATVs, boats and the like. In this specification, the relative terms "front," "rear," "left," and "right" are to be taken from the perspective of a rider of the motorcycle.

With initial reference to FIGS. 1 and 2, a scooter type motorcycle 1, which possesses an under-born type body frame 2, a front fork 4 that is pivot-supported so as to be capable of steering left/right by a head pipe 3 placed in a front end of the body frame 2, a swing type engine unit 5 is pivot-supported so as to be swingable up and down in a center part of the body frame 2, and a straddle-type seat 6 for two riders, which is mounted above the engine unit 5 of the body frame 2.

A front wheel 7 preferably is shaft-supported in a lower end of the front fork 4, and a steering handle 8 is fixed to an upper end. In this front fork 4, there is disposed a front fender 22 covering an upper part of the front wheel 7.

Preferably rear wheel 9 is shaft-supported in a rear end part of the engine unit 5, and a rear cushion 10 is disposed between the engine unit 5 and the body frame 2.

Below the seat 6 in the illustrated scooter 1, a storage box 30 and a fuel tank 31 are respectively disposed in parallel in front and rear. A front end part of the seat 6 is supported by the storage box 30 so as to be pivotable up and down.

A front side of the head pipe 3 of the body frame 2 preferably is covered by a front cover 15, and a rear side preferably is covered by a leg shield 16. Further, a periphery lower part of the seat 6 preferably is covered by left/right side covers 17, 17 and, in lower faces of the left/right side covers 17, 17, there is disposed a rear fender 18 covering an upper part of the rear wheel 9. A taillight device 27 is disposed in the rear end parts of the left/right side covers 17, 17.

Further, between the leg shield 16 and the left/right side covers 17, there preferably is disposed a foot board 19 supporting feet of a rider. A bottom side of the foot board 19 is covered by an under cover 20.

As to the steering handle 8, its periphery preferably is covered by a handle cover 21. In the handle cover 21, there preferably is disposed a meter device 25 having a speedometer, a fuel residual quantity meter, and the like.

With additional reference to FIGS. 3 and 4, in the front cover 15, there is disposed a headlight device 26, which will be discussed in more detail below. This front cover 15 has an upside cover part 15a, which extends forward slantingly downward between the handle cover 21 and the front fender 22, and a downside cover part 15b, which extends rearward slantingly downward so as to cover a rear part of the front fender 22. As such the illustrated front cover is and has an approximately L-letter shape if seen from a side of the vehicle.

In a vehicle width direction center part of the downside cover part 15b, there is disposed a component which is a body separate from the front cover 15 and, in this component, there are provided plural traveling wind introduction ports 15c. These traveling wind introduction ports 15c are covered by the front fork 4 and the front wheel 7 when seen from a vehicle front face. The traveling wind flows from the traveling wind introduction ports 15c toward the engine unit 5 while passing through a tunnel-like passage formed by the foot board 19 and the under cover 20.

In the upside cover part 15a of the front cover 15, there preferably is formed a light opening 15d of a size extending over almost the whole width of the upside cover part 15a. In the illustrated embodiment, the light opening 15d has an approximately V-shape when seen from the vehicle front. Its lower edge is placed in a lower end of the upside cover part 15a, and its left/right upper edges are placed near an upper edge part of the upside cover part 15a.

In left/right lower end parts, of the upside cover part 15a, adjacent the light opening 15d, there preferably are formed air duct parts 15e, 15e opening to the front. Each of the left/right air ducts 15e preferably is formed so as to have a generally tubular shape in which its inner periphery edge extends rearward.

A horn opening 15f having a generally V-letter shape is formed in a V-letter portion of the upside cover part 15a. The horn opening 15f is formed so as to have a tubular shape in which its inner periphery edge extends rearward. By the horn opening 15f and the left/right air duct parts 15e, rigidity of the front cover 15 is increased in the area about the light opening 15d.

A horn 50 preferably is disposed in a site aligned with the horn opening 15f in the upside cover part 15a. The horn 50 preferably is attached to a bracket (not shown in the drawing) that is fixed to the head pipe 3 so as to protrude forward, and is adapted such that sound from the horn 50 is transmitted to the vehicle front while passing through the horn opening 15f.

With additional reference to FIGS. 4-11, the headlight device 26 preferably is mounted to the light opening 15d. The headlight device 26 preferably comprises a resin-made light body 51 having a lens opening 51a that opens to the vehicle front, a colorless, transparent lens 52 disposed in the light body 51 so as to cover the lens opening 51a, a head bulb (main bulb) 53 preferably is detachably attached to the light body 51 so as to be placed in a vehicle width direction center, and a resin-made head reflector (main reflector) 54 which reflects the light from the head bulb 53 toward the lens 52.

The headlight device 26 preferably possesses flasher lights 56, 56 disposed in left/right outsides of the head bulb 53 in the light body 51. The left/right flasher lights 56 possess flasher bulbs 56a, 56a that are detachably attached to the light body 51, and flasher reflectors 56b, 56b that reflect light from the associated flasher bulb 56a toward the lens 52. In the illustrated embodiment, the lens 52 is made common to the head bulb 53 and the flasher bulbs 56a, 56a.

The head reflector 54 preferably is approximately cup-like. In one embodiment, the head reflector 54 inner periphery face has a reflecting face formed by an AL vapor deposition or the like. The head bulb 53 is mounted to its bottom part (see FIG. 7). The head reflector preferably 54 is supported with respect to the light body 51 through a supporting point 54a (see FIG. 8), and it preferably is possible to adjust its optical axis.

The illustrated light body 51 has a body main body 51c in which a bulb mounting hole 51b is formed. A concave groove 51d preferably is formed in a peripheral edge part of the lens opening 51a of the body main body 51c. Plural attaching pieces 51e protrude outward as part of an edge part of the lens opening 51a, and cylindrical attaching boss parts 51f are formed in left/right outer edge parts of the body main body 51c so as to protrude rearward.

An outer peripheral edge part 52a of the lens 52 preferably is water-tightly fixed into the concave groove 51d by an adhesive, seal, or other means. In the outer peripheral edge part 52a of the lens 52, there preferably is formed a positioning protrusion 52b abutting against the edge part of the lens opening 51a, as illustrated in FIG. 8.

In an inside edge part of the light opening 15d of the front cover 15, a cylindrical fixation boss part 15g is formed and arranged to align with each of the attaching pieces 51e. Preferably the bosses 15g are unitarily formed with the front cover 15. The light body 51 is fixed to the front cover 15 by fastening each attaching piece 51e to the fixation boss part 15g by a screw 57 or other fastener inserted from a vehicle rear.

As best shown in FIG. 10, in an inside wall of the leg shield 16, attaching seats 16a, 16a preferably align with the left/right attaching boss parts 51f and extend forwardly. The light body 51 is fixed to the leg shield 16 by fastening the left/right attaching boss parts 15f to the left/right attaching seats 16a by a screw 58 inserted from the vehicle rear or other suitable fastening structure and method.

If seen from the vehicle front, the lens 52 has an approximately V-letter shape extending along the light opening 15d. The head bulb 53 is disposed in a center of the V-letter shape of this lens 52, and the flasher bulbs 56a, 56a are disposed in left/right upper end parts of the V-letter shape.

If seen from the vehicle side, left/right upper parts of the V-letter shape of the lens 52 are formed so as to form approximately the same plane as the front cover 15, and its lower part is bulge-formed from the front cover 15 so as to make an approximately particularly-spherical shape forward slantingly downward. A lower face of a bulge part 52c having been bulge-formed is covered by a lower edge part 15h of the light opening 15d, and the lower edge part 15h preferably is placed rearward than a lower edge part 52d of the lens 52.

The bulge part 52c of the lens 52 protrudes forwardly relative to a straight line D connecting front edge parts of the handle cover 21 and the front fender 22 (see FIG. 1). By this, it follows that the traveling wind flows upward approximately along the straight line D to the handle cover 21 from the front fender 22, the lens 52 and the front cover 15, and flows toward a rider's head upper part from the handle cover 21.

The headlight device 26 preferably possesses a position bulb 60 for increasing the passive visibility (easy to recognize visually) during day time running. In some embodiments the position bulb 60 has structure as described below.

In a preferred embodiment, an approximately cylindrical position guide 54b is formed, preferably unitarily formed in a lower part of the head reflector 54. The guide 54b preferable extends approximately horizontally from a bottom part of the head reflector side toward a lens side that is a reflecting direction of the light, i.e., a front-rear direction of the vehicle. The position guide 54b preferably has an opening 54e in a vehicle front side. The position guide 54b and the head reflector 54 can be seen through the lens 52 from outside the vehicle.

A cylindrical bulb mounting part 51g preferably is formed facing the position guide 54b of the light body 51. The position bulb 60 is detachably mounted to the bulb mounting part 51g so as to be placed in a head reflector side near end part, i.e., a side opposite to the opening 54e, in the position guide 54b in an axial direction.

As seen from the vehicle front, the position guide 54b is disposed vertically below the head bulb 53, and arrayed with the head reflector 54 in a vertical direction. Further, preferably approximately an upper half of the position guide 54b, is part of the contour of the head reflector 54.

An opening lower edge 54d of the head reflector 54 and a front end part of the position guide 54b preferably are monolithically connected by left/right ribs 54c, 54c. The left/right ribs 54c, 54c slant forwardly and downwardly and are connected to left/right side faces of the position guide 54b. In another embodiment, the ribs decrease in width moving forwardly.

As viewed from the side (see FIG. 6), the position guide 54b preferably protrudes forwardly from the head reflector 54 to thereby extend into the bulge part 52c of the lens 52, and its opening 54e is placed near an inner face of the lens 52.

In the illustrated embodiment, a tip part 54e' of the position guide 54b is placed forward of the outer periphery edge part 52a that is a rear end part of the lens 52, and is placed forward of the lens opening 51a that is a front edge of the light body 51, and additionally is placed forward of the lower edge part 15h of the light opening 15d of the front cover 15.

In one preferred embodiment, the position guide 54b is tapered, having a diameter that becomes smaller as going to an opening 54e side from a head reflector side. In other embodiments, the position guide 54b maintains its dimensions, or slightly enlarges.

Preferably, a position width dimension (first dimension) w1 of the position guide 54b is set smaller than a main width dimension w2 of the head reflector 54. In the illustrated embodiment, the position width dimension w1 is between about ⅕-½ of the main width dimension w2.

In the illustrated embodiment, the position width dimension is between about ⅕-½ that of the main width dimension w2. Also, a position longitudinal dimension (second dimension) h1 in the vertical direction of the position guide 54b preferably is smaller than a main longitudinal dimension h2 of the head reflector 54.

Further, the position width dimension w1 of the position guide 54b preferably is somewhat greater than the position longitudinal dimension h1. As such, if seen from the front, the illustrated position guide 54b is generally elliptical. Of course, in other embodiments, other cross-sectional shapes, such as circular, square or the like can be employed.

In one embodiment, the cylindrical position guide 54b extends from the head reflector 54 side toward the lens 52 side, which is a reflection direction of light that is reflected by the head reflector 54. The position bulb 60 has been disposed in a side opposite to the opening 54e in the position guide 54b. Also, the position width dimension w1 of the position guide 54b has been made smaller than the main width dimension w2 of the head reflector 54. As such, the position bulb 60 is surrounded by the position guide 54b, whose width dimension is smaller than the head reflector 54. By this, the position bulb 60 becomes difficult to be seen from the vehicle front.

In one embodiment, since the tip part 54e' of the position guide 54b protrudes forwardly or the head reflector 54, it follows that the position bulb 60 is surrounded by the position guide 54b similarly to the above, and the position bulb 60 is difficult to be seen from the vehicle front.

Since the position guide 54b, whose diameter is smaller than the head reflector 54, protrudes forward of the head reflector 54, if seen through the lens 52, the position guide 54b seems like a barrel or a gun barrel, thus providing a strong external appearance.

Since in one embodiment the tip part 54e' of the position guide 54b is placed forward of the outer periphery edge part 52a of the lens 52 and forward of the lens opening 51a of the light body 51, and additionally is forward of the lower edge part 15h of the light opening 15d of the front cover 15, it follows that the position guide 54b is placed in a front-most vehicle tip, thus providing a novel external appearance.

In one embodiment the position width dimension w1 of the position guide 54b has been made larger than the position longitudinal dimension h1, thus providing certain strength characteristics and a more novel external appearance, as well as additionally contributing to hiding direct viewing of the position bulb 60.

In one embodiment, the position guide 54b is monolithically formed in the head reflector 54, and the upper half part of the position guide 54b is formed so as to enter to a center side with respect to the head reflector 54. Such an embodiment can use a reduced number of components in comparison with an embodiment where the position guide is formed by separate components. Further, such an embodiment can increase the rigidity of the whole head reflector 54. Further, it is possible to shorten a vertical spacing between the position guide 54b and the head bulb 53, thus enabling, at least, miniaturization of the head reflector 54. In another embodiment, the whole of the position guide 54b can be placed inside a contour of the head reflector 54.

Since one embodiment of the position guide 54b has been formed with a taper whose diameter becomes small as going to the opening 54e side, a draft angle when resin-molding the head reflector 54 can be ensured, and a more novel external appearance can be obtained.

In one embodiment, since the opening lower edge 54d of the head reflector 54 and the front end part of the position guide 54b have been monolithically connected by the left/right ribs 54c, 54c slanting such that a vehicle width direction dimension becomes small as going to the front side, it is possible to increase the rigidity of the whole head reflector 54.

In an embodiment discussed above, the position guide 54b has been formed like the taper whose diameter becomes small as going to the opening 54e side. With next reference to FIG. 12, another embodiment may have a structure in which the position guide 54b has been formed like the taper whose diameter becomes small as going to the opening 54e side, and the tip part 54e' has been reduced such that its diameter becomes smaller. In such an embodiment, the draft angle can be ensured, and the position bulb is difficult to see from the front, thus further benefiting the vehicle's outward appearance.

In embodiments discussed above, the cylindrical position guide 54b has been monolithically formed in the lower part of the head reflector 54. However, it is to be understood that other configurations are contemplated. For example, FIG. 13 shows an embodiment in which, below a lower side part 54' of the head reflector 54, an arc-like position guide 54b' is monolithically formed so as to extend approximately along the lower side part 54', and the position bulb 60 is disposed in a rear end part of the position guide 54b'. In the illustrated embodiment, a position width dimension w1' of the position guide 54b is set smaller than the main width dimension w2 of the head reflector 54. Further, an upper half part of the position guide 54b' enters to a center side by x with respect to the contour of the head reflector 54. Also in this case, the position bulb 60 is difficult to see from the outside, thus maintaining a good outward appearance for the vehicle.

Further, although above embodiments have shown the position guide in the downside of the head reflector, in other embodiments the position guide 54b may be disposed in an upside of the head reflector 54 such as is shown in FIG. 14. In other embodiments, the position guide may be disposed in left/right side parts.

In one embodiment, the opening lower edge 54d of the head reflector 54 and the front end part of the position guide 54b have been monolithically connected by the left/right ribs 54c, 54c that slant so as to become narrow in width as going to the front side. Other embodiments can have different configurations. For example, as shown in FIG. 15(a), the head reflector 54 and an upper edge part of the position guide 54b may be monolithically connected by a flat plate-like rib 54c'.

Further, as shown in FIG. 15(b), the head reflector 54 and the upper edge part of the position guide 54b may be monolithically connected by an arc-like rib 54c" as seen from the front. This type of embodiment can also increase the rigidity of the head reflector 54.

Although the headlight device and associated vehicle has been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the headlight device have been shown and described in detail, other modifications, which are within the scope of this application, will be readily apparent to those of skill in the art based upon this disclosure. It is also contemplated that various combinations or subcombinations of the specific features and aspects of the embodiments may be made and still fall within the scope of the application. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

What is claimed is:

1. A headlight device for a vehicle, comprising a body having an opening, a lens covering the body opening, a main light source supported by the body, a main reflector supported by the body, the main reflector adapted to reflect light from the main light source in a predetermined direction and having a maximum width, a generally tubular position guide extending in a front to rear direction and having a front opening, and a position light source arranged at or adjacent the position guide and arranged so that light from the position light source is directed out of the position guide front opening, wherein the position guide is arranged adjacent the main reflector and has a maximum width, and the position guide maximum width is less than the main reflector maximum width, and wherein the main light source and position light source are located generally in the same position along the longitudinal direction of the vehicle body.

2. A headlight device as in claim 1, wherein the position guide light source is arranged at a rear end of the position guide opposite the front opening.

3. A headlight device as in claim 1, wherein the position guide has a height in a direction generally perpendicular to its width, and the position guide width is greater than the position guide height.

4. A headlight device as in claim 1, wherein the main reflector has an outer perimeter shape as seen from the headlight device front, and at least part of the position guide is arranged within the main reflector outer perimeter shape.

5. A headlight device as in claim 1, wherein the position guide is disposed below the main bulb.

6. A headlight device as in claim 1, wherein the position guide is disposed above the main bulb.

7. A headlight device as in claim 1, wherein the position guide generally tapers from a rear portion toward a front portion.

8. A headlight device as in claim 1, wherein at least part of the position guide is formed monolithically with the main reflector.

9. A headlight device as in claim 8, wherein a front edge of the main reflector and the position guide are monolithically connected by a rib, wherein the rib is configured so that a rib width decreases going forwardly.

10. A headlight device for a vehicle, comprising a body having an opening, a lens covering the body opening, a main light source supported by the body, a main reflector supported by the body, the main reflector adapted to reflect light from the main light source in a predetermined direction, a generally tubular position guide extending in a front to rear direction and having a front opening, and a position light source arranged at or adjacent the position guide and arranged so that light from the position light source is directed out of the position guide front opening, wherein the position guide front opening is arranged forwardly of the main reflector, and wherein the main light source and position light source are generally in the same position along the longitudinal direction of the vehicle body.

11. A headlight as in claim 10, wherein the position light source is generally axially aligned with the position guide front opening.

12. A headlight as in claim 11, wherein the position guide light source is arranged at a rear end of the position guide opposite the front opening.

13. A headlight as in claim 10, wherein the lens has a rear edge adapted to engage a front edge of the body, and a front tip of the position guide is disposed forwardly of the rear edge of the lens.

14. A headlight as in claim 13, wherein the lens is curved so as to define a bulging portion, and wherein the front opening of the position guide is generally adjacent the bulging portion of the lens.

15. A headlight device as in claim 10, wherein the body has a front edge, and a front tip of the position guide is disposed forwardly of the front edge of the body.

16. A vehicle having a headlight device and a front cover surrounding a circumference of the headlight device, the headlight device comprising a body having an opening, a lens covering the body opening, a main reflector disposed in the body opening, a main light source arranged adjacent the main reflector so that the main reflector reflects light from the main light source in a predetermined direction, a generally tubular position guide disposed in the body opening and extending in a front to rear direction of the vehicle, the position guide having a front tip and a front opening, and a position light source arranged so that light from the position light source is directed out of the position guide front opening, wherein the position guide front tip is arranged forwardly of the main reflector, and wherein the position guide front tip is disposed forwardly of a front edge of the front cover, and wherein the main light source and position light source are generally in the same position along the longitudinal direction of the vehicle body.

17. A headlight as in claim 16, wherein the lens is curved so as to define a bulging portion at a front-most portion of the lens, and wherein the front tip of the position guide is disposed generally within the bulging portion of the lens.

18. A headlight as in claim 16, wherein the position guide has a width and the main reflector has a width, and the position guide width is less than the main reflector width.

19. A headlight as in claim 18, wherein the at least part of the position guide is formed monolithically with the main reflector.

* * * * *